Patented Apr. 27, 1948

2,440,355

UNITED STATES PATENT OFFICE 2,440,355

PROCESS AND CULTURE MEDIA FOR PRODUCING PENICILLIN

Otto K. Behrens, Indianapolis, Ind., assignor to Eli Lilly and Company, Indianapolis, Ind., a corporation of Indiana No Drawing. Application August 24, 1945, Serial No. 612,525

7 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products, chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By our invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of the phenylacetal compound, N-phenylacetyl-α-amino-β,β-dimethylacrylic acid which may be represented by the formula

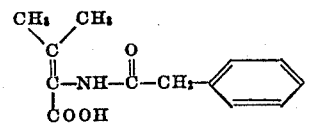

and salts and lower alkyl esters thereof. According to a preferred method the Penicillium mold and the phenylacetyl compound as represented above are associated with an aqueous culture medium containing nutrient material suitable for the growth and development of the mold and the mold is grown under penicillin-producing conditions. The compound is incorporated in the nutrient medium in effective amount less than about 1 percent and preferably less than about 0.3 percent. The amount of material which accelerates the production of penicillin may accordingly be present in relatively small amount although over a substantial range. For example, the method may be effectively carried out by associating about 0.019 percent of N-phenylacetyl-α-β,β-dimethylacrylic acid and the Penicillium mold with a culture medium containing mold-growth-supporting material, and under similar conditions there may be satisfactorily employed both larger and smaller amounts of N-phenylacetyl-α-amino-β,β-dimethylacrylic acid.

In another aspect there is provided by this invention a culture medium comprising the mold-growth-supporting material and a phenylacetyl compound as described in the next preceding paragraph. In a preferred form the culture medium may comprise water, mold-growth-supporting material, and, in amount effective to accelerate the production of penicillin and less than about 1 percent and preferably less than about 0.3 percent, a phenylacetyl compound as described. The amount of the compound which accelerates the production of penicillin may vary substantially throughout the range indicated above. By way of example, the culture medium may contain about 0.019 percent of N-phenylacetyl-α amino-β,β-dimethylacrylic acid.

The phenylacetyl compound employed in this invention is novel per se and is disclosed in detail and claimed in copending application Serial No. 612,523, filed August 24, 1945.

This invention will now be described in detail in its present preferred application to the submerged culture process of producing penicillin.

In the submerged culture process, the culture medium comprises water and mold-growth-supporting material. The nutrient material may consist of ingredients known to those skilled in the art. A prominent constituent of one type of suitable nutrient material is that known as corn steep solids which is a by-product obtained in the manufacture of corn starch. Corn steep solids is a desirable material because of its low cost and its effectiveness in bringing about a relatively high yield of penicillin. On the other hand corn steep solids is of indetermined chemical composition, some ingredients of which may make more difficult the isolation of the penicillin produced during the growth of the mold. With a major constitutent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum, group and illustratively a strain of this mold suitable for the purposes of this invitation is that known as strain N. R. R. L. 1976.

The phenylacetyl compound, namely, N-phenylacetyl-α-amino-β,β-dimethylacrylic acid employed for the purposes of this invention, may be employed in the form of its free acid and also in the form of its salts such as the sodium, potassium, magnesium, ammonium, and substituted ammonium salts, as well as in the form of its lower alkyl esters such as the methyl, ethyl, and propyl esters, and such salts and esters are included within the scope of this invention.

The amount of N-phenylacetyl-α-amino-β,β-dimethylacrylic acid or salts or esters thereof employed in carrying out this invention may vary to a substantial extent. The effective amount ranges up to about 10 grams per liter of culture medium, or in other words, up to about 1 percent on a weight-volume basis, although it is preferred to employ the phenylacetyl compound in an amount less than about 0.3 percent. The present optimum range when using, for example N-phenylacetyl-α-amino-β,β-dimethylacrylic acid, is about 0.019 percent. In general there is no particular advantage to be gained by employing an amount of the phenylacetyl compound in substantial excess of the amount effective in promoting the maximum production of penicillin by the mold.

The phenylacetyl compound may be associated with the mold and culture medium at any suitable time. Thus the materials of the culture medium upon association in a suitable container may be inoculated with the Penicillium mold, and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased from 30 to upwards of 60 percent. This range is of course illustrative and lesser or greater yields are within the contemplation of the invention depending upon the conditions under which the penicillin is produced.

Specific examples further illustrating the invention particularly with respect to the deep culture process of producing penicillin are given below.

*Example 1*

A suitable culture medium for the growth of a Penicillium mold is as follows:

| | | |
|---|---|---|
| Corn steep solids | pounds | 500 |
| Corn sugar | do | 125 |
| Lactose | do | 500 |
| Calcium carbonate | do | 50 |
| Zinc sulfate heptahydrate | do | 1.0 |
| Water | gallons | 3,000 |

Addition of about 3½ pounds of N-phenylacetyl-α-amino-β,β-dimethylacrylic acid equivalent on a weight-volume basis to 0.019 percent, inoculation of the culture medium with a Penicillium mold, strain N. R. R. L. 1976 and growth of the mold for about 3 days at 27° C. produces an increase of penicillin production greater by 30 percent than the amount of penicillin produced by the growth of the mold under the same conditions as above except in the absence of N-phenylacetyl-α-amino-β,β-dimethylacrylic acid.

Example 2

Another medium suitable for the growth of a Penicillium mold is as follows:

| | | |
|---|---|---|
| Lactose | grams | 35 |
| Corn steep solids | do | 20 |
| Zinc sulfate heptahydrate | do | 0.004 |
| M/50 phosphate buffer | cubic centimeters | 5 |
| Water, q. s. | do | 1,000 |

Addition of 0.19 g. of N-phenylacetyl-α-amino-β,β-dimethylacrylic acid equivalent on a weight-volume basis to 0.019 percent, inoculation of the culture medium with a Penicillium mold, strain N. R. R. L. 1976, and growth of the mold for 3 days at 27° C. produces a concentration of penicillin greater by 30 percent or more than is produced in the above culture medium under the same conditions of growth but in the absence of N-phenylacetyl-α-amino-β,β-dimethylacrylic acid.

In the above examples "corn steep solids" has been included as a constituent of the culture medium. Corn steep solids assists in the obtaining of high yields of penicillin but due in part to the heterogeneous nature of the corn steep solids, difficulty is involved in the separation of penicillin from other constituents of the culture medium following the growth of the mold.

In the following examples the culture medium does not contain corn steep solids and is of more precise chemical composition. The employment of such culture medium may result in the production of a lower yield of penicillin. On the other hand, penicillin which is produced may be considerably more readily separated from the culture medium following the growth of the mold.

Example 3

A culture medium not embodying corn steep solids is as follows:

| | | |
|---|---|---|
| Potassium dihydrogen phosphate | grams | 1.0 |
| Dipotassium hydrogen phosphate | do | 1.0 |
| Magnesium sulfate heptahydrate | do | 1.0 |
| Sodium nitrate | do | 2.0 |
| Lactose | do | 10.0 |
| Zinc sulfate heptahydrate | do | 0.01 |
| Water, q. s. | cubic centimeters | 2,000 |

A culture medium of the above composition wherein is incorporated 0.019 percent of N-phenylacetyl-α-amino-β,β-dimethylacrylic acid on a weight-volume basis and inoculated with the Penicillium mold, strain N. R. R. L. 1976, mechanically agitated and maintained at a temperature of about 27° C. for 6 days, produces a concentration of penicillin greater by 40 percent or more than is produced under the same conditions with the above culture medium in the absence of N-phenylacetyl-α-amino-β,β-dimethylacrylic acid. Thus, there has been produced a concentration of penicillin of 21 Oxford units per cc. of culture medium in the presence of N-phenylacetyl-α-amino-β,β-dimethylacrylic acid as contrasted to the concentration of only 15 Oxford units of penicillin per cc. of culture medium obtained in the absence of N-phenylacetyl-α-amino-β,β-dimethylacrylic acid.

Example 4

Another culture medium not embodying corn steep solids is as follows:

| | | |
|---|---|---|
| Water | cubic centimeters | 1,000 |
| Lactose | grams | 25.0 |
| Dextrose | do | 5.0 |
| Sodium nitrate | do | 5.0 |
| Ammonium nitrate | do | 5.0 |
| Potassium dihydrogen phosphate | do | 1.0 |
| Magnesium sulfate | do | 0.25 |
| Acetic acid | do | 5.0 |

Incorporation of 0.021 percent of sodium N-phenylacetyl-α-amino-β,β-dimethylacrylate in the culture medium, inoculation with the Penicillium mold, strain N. R. R. L. 1976, mechanical agitation and growth at a temperature of about 27° C. for 6 days produces a concentration of penicillin greater by 35 percent or more than is produced under the same conditions in the above culture medium but in the absence of sodium N-phenylacetyl-α-amino-β,β-dimethylacrylate.

As previously mentioned, the compound to be employed in carrying out this invention is novel and its preparation is disclosed in copending application Serial No. 612,523, filed August 24, 1945. For purposes of convenience, the preparation of the compound is given below.

Preparation of N-phenylacetyl-α-amino-β,β-dimethylacrylic acid 2.7 g. of β-hydroxyvaline in a solution of 5 g. of sodium bicarbonate dissolved in 100 cc. of water, are treated with small portions of phenylacetyl chloride until a total of 1.5 g. have been added. During the addition, the mixture is constantly agitated and kept below 25° C. The reaction mixture is then acidified with hydrochloric acid and allowed to stand at about 0° C., whereupon N-phenylacetyl-β-hydroxyvaline precipitates. This valine compound is recrystallized from dilute alcohol and melts at about 119–120° C.

N-phenylacetyl-α-amino-β,β-dimethylacrylic acid is prepared from the N-phenylacetyl-β-hydroxyvaline by heating 1.5 g. of the valine compound with 5 cc. of acetic anhydride at about 70° C. for one hour. The excess acetic anhydride and the acetic acid formed during the reaction are then removed by heating in vacuo at 70° C. To the residue consisting of N-phenylacetyl-α-amino-β,β-dimethylacrylic acid azlactone are added 5 cc. of water and 6 cc. of acetone, and the mixture refluxed for one hour. The acetone is distilled from the mixture and the solution cooled to about 0° C., whereupon N-phenylacetyl-α-amino-β,β-dimethylacrylic acid crystallizes. It is partially purified by washing with chloroform-petroleum ether mixture and further purified by precipitation from 15 cc. of hot acetone by the addition of 20 cc. of water. The N-phenylacetyl-α-amino-β,β-dimethylacrylic acid thus obtained melts at about 176–177° C. A micro-Dumas analysis has shown the presence of 5.99 percent of nitrogen as compared with a calculated value of 6.01 percent.

Having thus described my invention what I claim as new and desire to secure by Letters Patent of the United States is:

1. The method of producing penicillin in submerged culture which comprises growing a Penicillium mold of the notatum-chrysogenum group in a culture medium in the presence of an effective amount less than about one percent of a member of the group consisting of N-phenyl-acetyl-α-amino-β,β-dimethylacrylic acid represented by the formula

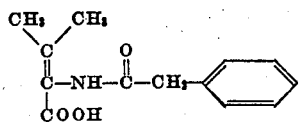

and salts and lower alkyl esters thereof.

2. The improved method of obtaining penicillin in submerged culture which comprises providing an aqueous culture medium for the growth and development of a Penicillium mold of the notatum-chrysogenum group, associating with said culture medium a Penicillium mold of the notatum-chrysogenum group and an effective amount less than about one percent of a member of the group consisting of N-phenylacetyl-α-amino-β,β-dimethylacrylic acid represented by the following formula

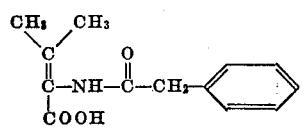

and salts and lower alkyl esters thereof.

3. In the method of producing penicillin in submerged culture by growing a Penicillium mold of the notatum-chrysogenum group in association with a nutrient material, the improvement which comprises incorporating in the nutrient material, in effective amount less than about 1 percent, a member of the group consisting of N-phenylacetyl - α - amino - β,β - dimethylacrylic acid represented by the formula

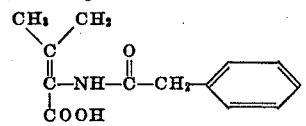

and salts and lower alkyl esters thereof.

4. The improved method of producing penicillin in submerged culture which comprises providing a culture medium containing nutrient material and associating with said culture medium a Penicillium mold of the notatum-chrysogenum group and about 0.019 percent of N-phenylacetyl-α-amino-β,β-dimethylacrylic acid represented by the formula

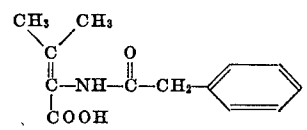

5. A culture medium for the production of penicillin in submerged culture through the growth of a Penicillium mold of the notatum-chrysogenum group, said culture medium comprising nutrient material and an effective amount less than about one percent of a member of the group consisting of N-phenylacetyl-α-amino-β,β-dimethylacrylic acid represented by the formula

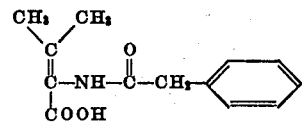

and salts and lower alkyl esters thereof.

6. A culture medium for the production of penicillin in submerged culture through the growth of a Penicillium mold of the notatum-chrysogenum group, said culture medium comprising water, nutrient material and in amount effective to accelerate the production of penicillin and less than about 1 percent, a member of the group consisting of N-phenylacetyl-α-amino-β,β-dimethylacrylic acid represented by the formula

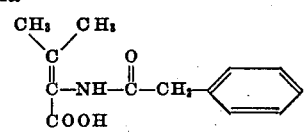

and salts and lower alkyl esters thereof.

7. A culture medium for the production of penicillin in submerged culture through the growth of a Penicillium mold of the notatum-chrysogenum group, said culture medium comprising water, nutrient material dispersed in said water and about 0.019 percent of N-phenylacetyl-α-amino-β,β-dimethylacrylic acid represented by the formula

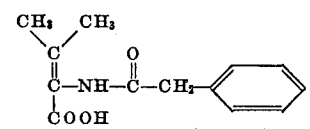

OTTO K. BEHRENS.

REFERENCES CITED

The following references are of record in the file of this patent:

Coghill, Monthly Progress Report No. 16, Nov. 20, 1943, distributed by Committee on Medical Research, OSRD, pages 1 and 2.

Pennsylvania, State College Penicillin Interim Report (45–124), March 30, 1945, page 1.

Certificate of Correction

Patent No. 2,440,355.                                                                                          April 27, 1948.

OTTO K. BEHRENS

It is hereby certified that errors appear in the printed specification of the above numbered patent requiring correction as follows: Column 2, line 18, for "phenylacetal" read *phenylacetyl*; line 42, for "N-phenylacetyl-α-" read *N-phenylacetyl-α-amino-*; column 3, line 28, for "indetermined", read *indeterminate*; line 57, strike out the comma after the syllable "genum" and insert the same after the word "group", same line; and that the said Letters Patent should be read with these corrections therein that the same may conform to the record of the case in the Patent Office.

Signed and sealed this 22nd day of June, A. D. 1948.

[SEAL]

THOMAS F. MURPHY,
*Assistant Commissioner of Patents.*